(12) United States Patent
Arafune et al.

(10) Patent No.: US 6,746,144 B1
(45) Date of Patent: Jun. 8, 2004

(54) SCANNING TUNNELING MICROSCOPE LIGHT EMITTING/CONDENSING DEVICE

(75) Inventors: Ryuichi Arafune, Natori (JP); Sukekatsu Ushioda, Sendai (JP); Kenji Sakamoto, Sendai (JP)

(73) Assignee: Japan Science and Technology Corporation, Kawaguchi (JP)

( * ) Notice: Subject to any disclaimer, the term of this patent is extended or adjusted under 35 U.S.C. 154(b) by 23 days.

(21) Appl. No.: 10/110,105

(22) PCT Filed: Aug. 17, 2000

(86) PCT No.: PCT/JP00/05498

§ 371 (c)(1),
(2), (4) Date: Apr. 8, 2002

(87) PCT Pub. No.: WO01/27588

PCT Pub. Date: Apr. 19, 2001

(30) Foreign Application Priority Data

Oct. 12, 1999 (JP) ............................................. 11/289763

(51) Int. Cl.⁷ ............................................... G01N 37/00
(52) U.S. Cl. ....................... 362/554; 362/804; 362/572; 362/575
(58) Field of Search ................. 362/554, 804, 362/572, 575; 606/473, 476

(56) References Cited

U.S. PATENT DOCUMENTS

| | | | |
|---|---|---|---|
| 5,294,790 A | * | 3/1994 | Ohta et al. .................... 250/216 |
| 5,713,364 A | * | 2/1998 | DeBaryshe et al. ......... 128/664 |
| 5,813,987 A | * | 9/1998 | Modell et al. ................. 60/473 |

FOREIGN PATENT DOCUMENTS

| | | |
|---|---|---|
| JP | 47311/1988 | 3/1988 |
| JP | 2-199757 | 8/1990 |
| JP | 10-10139 | 1/1998 |

* cited by examiner

*Primary Examiner*—Thomas M. Sember
(74) *Attorney, Agent, or Firm*—Oblon, Spivak, McClelland, Maier & Neustadt, P.C.

(57) ABSTRACT

An object is to provide a light collecting device for scanning tunneling microscope emission spectroscopy which has a higher light collective efficiency in vacuum without sacrifice in a high spatial resolution provided by the STM.

The light collecting device for scanning tunneling microscope emission spectroscopy comprises a scanning tunneling microscope, and a plurality of optical fibers (2) radially disposed around a scanning tunneling microscope probe (1) with the tip end of the probe (1) as the center so as to collect light emission in operating this microscope.

2 Claims, 1 Drawing Sheet

F I G. 1 (a)    F I G. 1 (b)
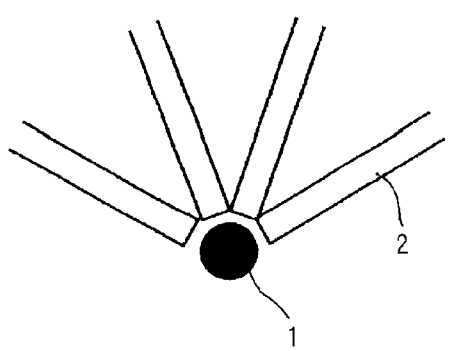
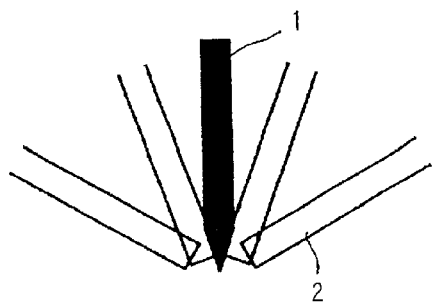
F I G. 2
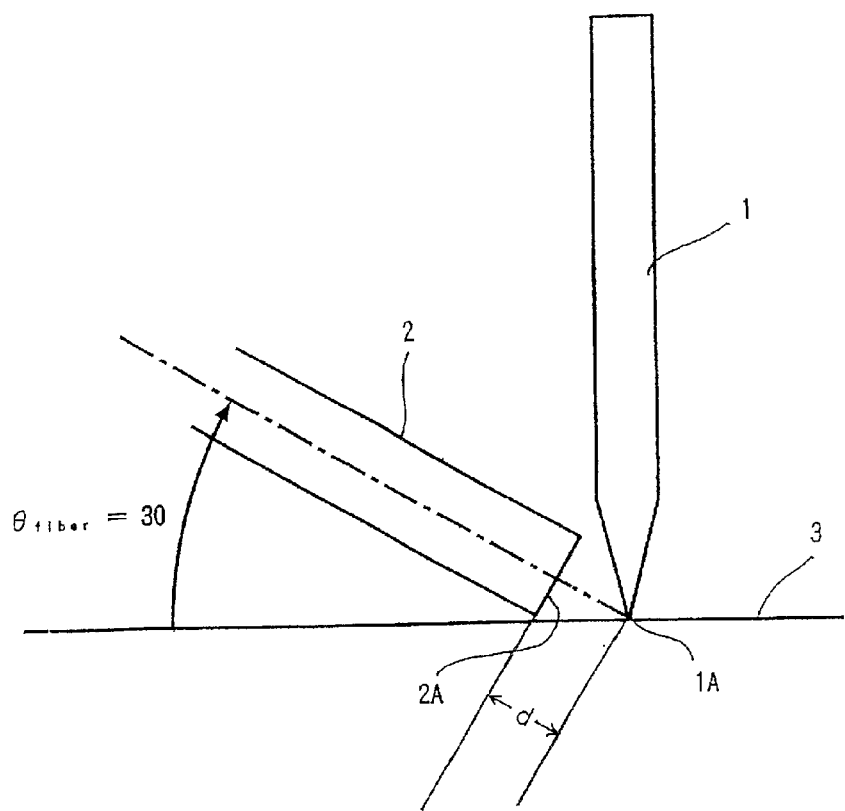

SCANNING TUNNELING MICROSCOPE LIGHT EMITTING/CONDENSING DEVICE

TECHNICAL FIELD

The present invention relates to scanning tunneling microscope (STM) emission spectroscopy, and more particularly to a light collecting device for scanning tunneling microscope emission spectroscopy which can collect light with high efficiency, which is a particularly important factor in measurement of a sample having a small emission intensity.

BACKGROUND ART

Conventionally, the following light collection devices using optical fibers have been used for STM emission spectroscopy.

(1) An optical (glass) fiber is extended along a single direction to the vicinity of a STM probe in order to collect light emitted from the STM probe and/or a sample [C. Thirstrup, M. Sakurai, K. Stokbro, and M. Aono, Phys. Rev. Lett. 82, 1241 (1999)].

(2) A plastic fiber [having a large numerical aperture (NA)] is extended along a single direction to the vicinity of a STM probe in order to collect light emitted from the STM probe and/or a sample. [M. J. Gallagher, S. Howells, L. Yi, T. Chen, and D. Sarid, Surf. Sci. 278, 270 (1992)].

(3) An optical fiber having a sharpened chip and coated with a transparent electrode is used as an STM probe, which is also used to collect light [T. Murashita and M. Tanimoto, Jpn. J. Appl. Phys. 34, 4398 (1995)].

DISCLOSURE OF THE INVENTION

In general, since quantum efficiency of STM emission is extremely low (about $10^{-4}$ or less), it is not easy to measure emitted light while maintaining the high spatial resolution of an STM (i.e., without increasing tunnel current and bias voltage). Therefore, realization of high light collection efficiency is an important factor for STM emission spectrophotometry.

However, the above-described prior art technique (1), in which an optical fiber is extended along a single direction to the vicinity of a STM probe, involves a problem in that the light-collection solid angle is restricted to a value determined by the NA (about 0.2) of the optical fiber, and a light-collection solid angle greater than the value cannot be obtained.

The above-described prior art technique (2), in which a plastic fiber having a larger NA is used to obtain a larger light-collection solid angle, involves a problem in that, since the plastic fiber does not has heat resistance, use under a super-high vacuum is difficult. (In order to attain super-high vacuum, in general, baking must be performed at a temperature of about 150°. However, existing plastic optical fibers do not have resistance to heat of that temperature.)

The impossibility of performing experiments under super vacuum results in impossibility of using STM emission spectroscopy for evaluation of a clean surface and thus greatly narrows the range of applications of the STM emission spectroscopy.

The above-described prior art technique (3) involves a problem in that the necessity of machining the probe restricts the types of usable probe materials, which are important for STM measurement.

An object of the present invention is to solve the above-described problems and to provide a light collecting device for scanning tunneling microscope emission spectroscopy, which realizes higher light-collection efficiency under vacuum without sacrificing the high spatial resolution of an STM.

In order to achieve the above-described object, the present invention provides the following.

[1] A light collecting device for scanning tunneling microscope emission spectroscopy, characterized by comprising a scanning tunneling microscope; and a plurality of optical fibers radially disposed around the tip of a probe of the scanning tunneling microscope in order to collect light which is emitted upon operation of the scanning tunneling microscope, the optical fibers being disposed in such a manner that the distance between the optical fibers and the tip of the probe becomes a distance corresponding to a focal distance.

[2] A light collecting device for scanning tunneling microscope emission spectroscopy according to [1] above, characterized in that the optical fiber is made of glass.

BRIEF DESCRIPTION OF THE DRAWINGS

FIG. 1 is a set of schematic views showing a light collecting device for STM emission spectroscopy according to an embodiment of the present invention.

FIG. 2 is a diagram relating to the embodiment and showing an angle formed between an optical fiber and a sample surface to be measured by the STM.

BEST MODE FOR CARRYING OUT THE INVENTION

An embodiment of the present invention will next be described with reference to the drawings.

In the present invention, a plurality of optical fibers are radially disposed around a tip of a probe in order to realize higher light-collection efficiency without sacrificing the performance of an STM.

FIG. 1 is a set of schematic views showing a light collecting device for STM emission spectroscopy according to an embodiment of the present invention, wherein FIG. 1(a) is plan view of the light collecting device, and FIG. 1(b) is a side view of the light collecting device. FIG. 2 is a diagram showing an angle formed between an optical fiber and a sample surface to be measured by an STM.

As shown in these drawings. N optical fibers 2 are disposed radially around an STM probe 1. These drawings show the arrangement of the optical fibers for the case in which N=4. The STM probe 1 is formed of tungsten. A sample 3 to be measured is an Au deposition film. Each of the optical fibers 2 is a quartz optical fiber having a core diameter of 200 μm (NA: about 0.2, light-collection solid angle: 0.127).

As shown in FIG. 2, each of the optical fibers 2 is extended along a direction of $\theta_{fiber}=30°$ with respect to the surface of the sample 3 in order to reach the vicinity of the probe 1. The reason whey the angle $\theta_{fiber}$ is set to 30° is that the highest emission intensity is obtained at this angle in STM emission (particularly for the case of a metal sample).

As shown in FIG. 2, the distance d between the tip 2A of the fiber and the tip 1A of the STM probe is set equal to or smaller than a value which corresponds to the focal distance of the optical fiber 2 represented by the following expression.

$$\text{(Radius of optical fiber core)}/[\tan(\sin^{-1}NA)] \qquad (1)$$

In the present embodiment, the distance d is set to 0.49 mm or less.

By virtue of the above-described arrangement, the light collection device of the present invention equivalently has a light-collection solid angle of 0.127×Nstr, which enables observation of an emission intensity N times (N=4 in the example of FIG. 1) that observed by use of a single optical fiber.

In the present invention, since the optical fiber is independent of the STM probe, an ordinary probe (which varies depending on the purpose of an experiment) can be used as is. Therefore, the present invention does not sacrifice the performance of the STM.

Moreover, the present invention enables provision of a light collecting device for scanning tunneling microscope emission spectroscopy, which realizes a higher light-collection efficiency as compared with conventional STM emission collection devices utilizing fibers, while maintaining the high spatial resolution of the STM.

Furthermore, optical fibers made of glass, which are excellent in heat resistance and vacuum resistance, are desirably used. In this case, high light collection efficiency can be realized under vacuum.

The present invention is not limited to the embodiments described above. Numerous modifications and variations of the present invention are possible in light of the spirit of the present invention, and they are not excluded from the scope of the present invention.

As have been described in detail, the present invention can achieve the following advantageous effects.

(1) The disposition of a plurality of optical fibers radially around a tip of an STM probe enables provision of a light collecting device for scanning tunneling microscope emission spectroscopy which realizes a higher light-collection efficiency as compared with conventional STM emission collection devices utilizing fibers, without sacrificing the high spatial resolution of the STM.

(2) Use of optical fibers made of glass enables provision of a light collecting device which is excellent in heat resistance and vacuum resistance and which realizes high light collection efficiency under vacuum.

INDUSTRIAL APPLICABILITY

The present invention is suitable for the field of scanning tunneling microscope (STM) emission spectrophotometry, and application to STM emission spectrophotometry for adsorptive molecules is expected; in particular, for examples having weak emission intensity.

What is claimed is:

1. A light collecting device for scanning tunneling microscope emission spectroscopy, comprising:

a scanning tunneling microscope; and a plurality of optical fibers radially disposed around a tip of a probe of the scanning tunneling microscope and configured to collect light emitted upon operation of the scanning tunneling microscope, the plurality of optical fibers being disposed such that a distance between the plurality of optical fibers and the tip of the probe becomes a distance corresponding to a focal distance.

2. A light collecting device for scanning tunneling microscope emission spectroscopy according to claim 1, wherein the optical fiber is made of glass.

* * * * *